(12) United States Patent
Koma et al.

(10) Patent No.: US 8,167,498 B2
(45) Date of Patent: May 1, 2012

(54) BEARING APPARATUS FOR AXLE AND METHOD OF MANUFACTURING THE SAME

(75) Inventors: Yutaka Koma, Hachioji (JP); Joji Miyawaki, Kashiwara (JP); Takumi Harada, Kawasaki (JP); Shigeru Inoue, Yokohama (JP)

(73) Assignee: JTEKT Corporation, Osaka-Shi, Osaka (JP)

( * ) Notice: Subject to any disclaimer, the term of this patent is extended or adjusted under 35 U.S.C. 154(b) by 568 days.

(21) Appl. No.: 12/071,503

(22) Filed: Feb. 21, 2008

(65) Prior Publication Data

US 2008/0219608 A1    Sep. 11, 2008

(30) Foreign Application Priority Data

Feb. 23, 2007   (JP) ................................. 2007-043661

(51) Int. Cl.
  F16C 19/08   (2006.01)
  F16C 33/80   (2006.01)
  F16C 41/04   (2006.01)
  B21D 53/10   (2006.01)
(52) U.S. Cl. ..... 384/448; 384/625; 384/589; 29/898.13; 29/898.063
(58) Field of Classification Search .......... 384/446–448, 384/477, 561, 569, 571, 572, 577, 589, 625; 324/173–174, 207.25; 29/898.06, 898.13, 29/898.063
See application file for complete search history.

(56) References Cited

U.S. PATENT DOCUMENTS

| | | | | |
|---|---|---|---|---|
| 5,085,519 | A * | 2/1992 | Dougherty | 384/448 |
| 5,123,755 | A * | 6/1992 | Faye et al. | 384/448 |
| 5,494,358 | A * | 2/1996 | Dougherty | 384/448 |
| 5,727,317 | A * | 3/1998 | Bekku et al. | 29/898.06 |
| 5,816,711 | A * | 10/1998 | Gingrich | 384/488 |
| 5,997,182 | A * | 12/1999 | Brown | 384/448 |
| 6,089,757 | A * | 7/2000 | Ouchi | 384/448 |
| 6,343,878 | B1 | 2/2002 | Ouchi | |
| 6,512,365 | B1 * | 1/2003 | Karpinski | 324/173 |
| 6,568,855 | B2 * | 5/2003 | Nakamura et al. | 384/448 |
| 6,637,943 | B2 * | 10/2003 | Novak et al. | 384/477 |

(Continued)

FOREIGN PATENT DOCUMENTS

EP    0 484 661 A1    11/1990

(Continued)

OTHER PUBLICATIONS

European Search Report dated May 6, 2008.

*Primary Examiner* — Marcus Charles
(74) *Attorney, Agent, or Firm* — McGinn IP Law Group, PLLC

(57) ABSTRACT

A body part of a rotation detecting sensor of a rotation number detector which is provided on a bearing apparatus for an axle has a large diameter part formed in its upper part and a small diameter part formed in its lower part, and at the same time, a sensor fitting hole part which is formed in an outer ring of a bearing part and into which the body part of the rotation detecting sensor is inserted is so formed that an radially outer part thereof has an inner diameter substantially equal to an outer diameter of the large diameter part of the body part, and a lower part thereof has an inner diameter slightly larger than an outer diameter of the small diameter part of the body part.

5 Claims, 3 Drawing Sheets

U.S. PATENT DOCUMENTS

| | | |
|---|---|---|
| 6,659,650 B2 * | 12/2003 | Joki et al. .................. 384/572 |
| 2003/0011358 A1 | 1/2003 | Karpinski |
| 2004/0258337 A1* | 12/2004 | Norimatsu et al. .......... 384/448 |

FOREIGN PATENT DOCUMENTS

| | | | |
|---|---|---|---|
| EP | 1 591 765 A1 | | 11/2005 |
| JP | 10-44822 | | 2/1998 |
| JP | 11248726 A | * | 9/1999 |
| JP | 2000002251 A | * | 1/2000 |
| JP | 2001-80307 | | 3/2001 |
| JP | 2001-199202 | | 7/2001 |
| WO | WO 2007/012072 A1 | | 1/2007 |

* cited by examiner

BEARING APPARATUS FOR AXLE AND METHOD OF MANUFACTURING THE SAME

BACKGROUND OF THE INVENTION

Field of the Invention

The present invention relates to a bearing apparatus for an axle which is used in an automobile or the like, and more particularly, to the bearing apparatus for the axle provided with a detector for detecting rotation of a wheel, and relates to a method of manufacturing the same.

There has been a wheel bearing apparatus provided with conventional detector for detecting rotation number of a wheel which includes a knuckle mounted on a vehicle body, an outer ring fitted to an inner diameter of this knuckle and having a plurality of rows of raceway surfaces formed on its inner periphery, a hub ring having a plurality of rows of raceway surfaces which is formed on an outer periphery there of and is opposed to the raceway surfaces of the outer ring and having a wheel mounting flange, an inner ring fitted to an end of the hub ring, and a plurality of rows of rolling elements arranged between the respective raceway surfaces of the outer ring, the hub ring and the inner ring, wherein a rotation number detecting sensor is inserted into a hole part which is formed through the knuckle and the outer ring so as to communicate in a radial direction, in such a manner that the rotation number detecting sensor is opposed to a pulsar ring which is provided between the raceway surfaces of the hub ring and the inner ring (Reference should be made to Japanese Patent Publication No. JP-A-2001-199202, for example).

Moreover, there has been a wheel bearing apparatus which includes a rotor for fixing a wheel and having a plurality of rows of raceway surfaces, an outer ring having a plurality of rows of raceway surfaces and a flange portion fixed to a knuckle on a vehicle body side, and a plurality of rows of rolling elements interposed between the respective raceway surfaces of the rotor and the outer ring, wherein a pulsar ring is disposed between the raceway surfaces of the rotor, and a sensor opposed to the pulsar ring is held by a holding member which is clamped between the flange portion of the outer ring and the knuckle (Reference should be made to Japanese Patent Publication No. JP-A-2001-80307, for example).

In the wheel bearing apparatus in JP-A-2001-199202, the rotation number detecting sensor is fitted into the hole part which is formed in a radial direction between the knuckle and the raceway surface of the outer ring in such a manner that the distal end of the sensor is opposed to the pulsar ring. However, the outer ring is provided with hardened layers which are formed by quenching around outer peripheries of the raceway surfaces, and so, there has been a problem that it is difficult and inaccurate to form the hole part with a drill, because the drill interferes with these hardened layers, which leads to a short life of the drill.

In view of the above, it has been considered to increase a distance between the raceway surfaces of the outer ring, that is, a distance between the hardened layers so that the drill may not interfere with the hardened layers. However, by increasing this distance, the bearing part becomes larger. Moreover, in some cases, this distance cannot be increased due to relative mounting positions of surrounding components.

In the wheel bearing apparatus in JP-A-2001-80307, the problem of drilling the hole part in the outer ring as in JP-A-2001-199202 will not happen, because the sensor is mounted on the holding member which is separately provided. However, not only the structure is complicated and annoying assembling works are required, but also, production cost is increased, because the holding member is formed of a separate component.

SUMMARY OF THE INVENTION

The invention has been made in order to solve the above described problems, and it is an object of the invention to provide a bearing apparatus for an axle provided with a sensor fitting hole part which can be easily drilled without interfering with hardened layers formed by quenching on outer peripheries of raceway surfaces of an outer ring in a bearing part, and wear of a drill can be suppressed even though the drill interferes with the hardened layers. The further object of the invention is to provide a method of manufacturing the bearing apparatus.

In order to achieve the object, the present invention provides the following arrangements.

(1) A bearing apparatus for an axle comprising:

a hub shaft that includes a flange provided on an outer side thereof and to which a wheel is attached, and a cylindrical part provided on an inner side of the flange;

a bearing part that includes an inner ring, an outer ring formed with a sensor fitting hole part and rolling elements arranged between the inner and outer rings, the bearing part being press-fitted into the cylindrical part of the hub unit;

a rotation number detector that includes a pulsar ring fixed to the inner ring of the bearing part, and a rotation detecting sensor having a body part and a fitting (securing) part, the body part being inserted into the sensor fitting hole part of the outer ring so that an distal end of the body part is opposed to the pulsar ring, wherein the body part of the rotation detecting sensor includes a small diameter part disposed at the distal end of the body part and a large diameter part disposed between the small diameter part and the fitting part, and wherein the sensor fitting hole part is formed so that a radially outer part of the sensor fitting hole part has an inner diameter substantially equal to an outer diameter of the large diameter part of the body part, and a radially inner part of the sensor fitting hole part has an inner diameter slightly larger than an outer diameter of the small diameter part of the body part.

(2) The bearing apparatus according to (1), wherein the radially upper part of the sensor fitting hole part is formed with a strict tolerance and the radially inner part thereof is formed with a tolerance enlarged to a minus side.

(3) The bearing apparatus according to (1), wherein the rotation number detector includes an O-ring provided on an outer periphery of an upper part of the body part of the rotation detecting sensor.

(4) A bearing apparatus for an axle comprising:

a hub shaft that includes a flange provided on an outer side thereof and to which a wheel is attached, and a cylindrical part provided on an inner side of the flange;

a bearing part which includes an inner ring, an outer ring formed with a sensor fitting hole part, and a plurality of rolling elements arranged between the inner ring and outer ring, the bearing part being press-fitted into the cylindrical part of the hub shaft; and a rotation number detector that includes a pulsar ring fixed to the inner ring of the bearing part, and a rotation detecting sensor having a body part and a fitting (securing) part, the body part being inserted into the sensor fitting hole part formed in the outer ring so that a distal end of the body part is opposed to the pulsar ring, wherein the body part of the rotation detecting sensor has a same diameter along an entire length thereof, and wherein the sensor fitting hole part is formed so that a radially outer part of the sensor fitting hole part has an inner diameter larger than an outer diameter of the body part, and a radially inner part of the sensor fitting hole part has an inner diameter substantially equal to the outer diameter of the body part.

(5) The bearing apparatus according to (4), wherein a rotation number detector includes an O-ring provided on an outer periphery of an upper part of the body part of the rotation detecting sensor.

(6) A method of manufacturing a bearing apparatus that comprises: a hub shaft that includes a flange provided on an outer side thereof and to which a wheel is attached, and a cylindrical part provided on an inner side of the flange; a bearing part that includes an inner ring, an outer ring formed with a sensor fitting hole part and rolling elements arranged between the inner and outer rings, the bearing part being press-fitted into the cylindrical part of the hub unit; a rotation detector that includes a pulsar ring fixed to the inner ring of the bearing part, and a rotation detecting sensor having a body part and a fitting part, the body part being inserted into the sensor fitting hole part of the outer ring so that an distal end of the body part is opposed to the pulsar ring, wherein the body part of the rotation detecting sensor includes a small diameter part disposed at the distal end of the body part and a large diameter part disposed between the small diameter part and the fitting part, the method comprising the step of:

forming, with a strict tolerance, a radially outer part of the sensor fitting hole part to have an inner diameter substantially equal to an outer diameter of the large diameter part of the body part; and forming, with a tolerance enlarged to a minus side, a radially inner part of the sensor fitting hole part to have an inner diameter slightly larger than an outer diameter of the small diameter part of the body part.

According to the bearing apparatus for the axle of the invention, it is possible to drill the sensor fitting hole part easily without interfering with the hardened layers which have been formed by quenching on the outer peripheries of the raceway surfaces of the outer ring in the bearing part, and it is possible to suppress wear of the drill, even though the drill interferes with the hardened layers. Moreover, the rotation detecting sensor which is inserted into this sensor fitting hole part is air tightly kept, and hence, dust or the like will not enter into the bearing part from between the sensor and the sensor fitting hole part.

DETAILED DESCRIPTION OF PREFERRED EMBODIMENTS

Embodiment 1

Figure 1:
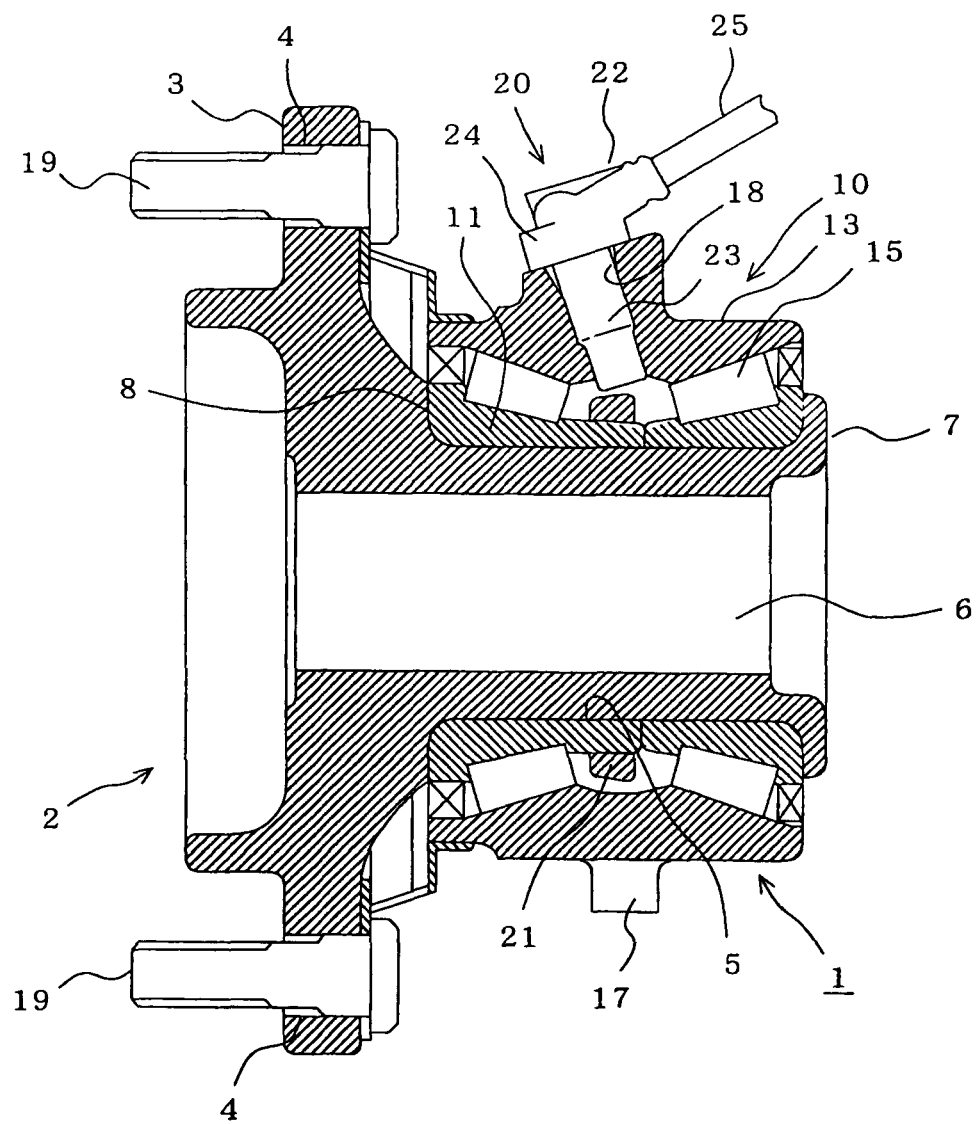
FIG. 1 is a longitudinal sectional view of a bearing apparatus for an axle in Embodiment 1 according to the invention.
Figure 2:
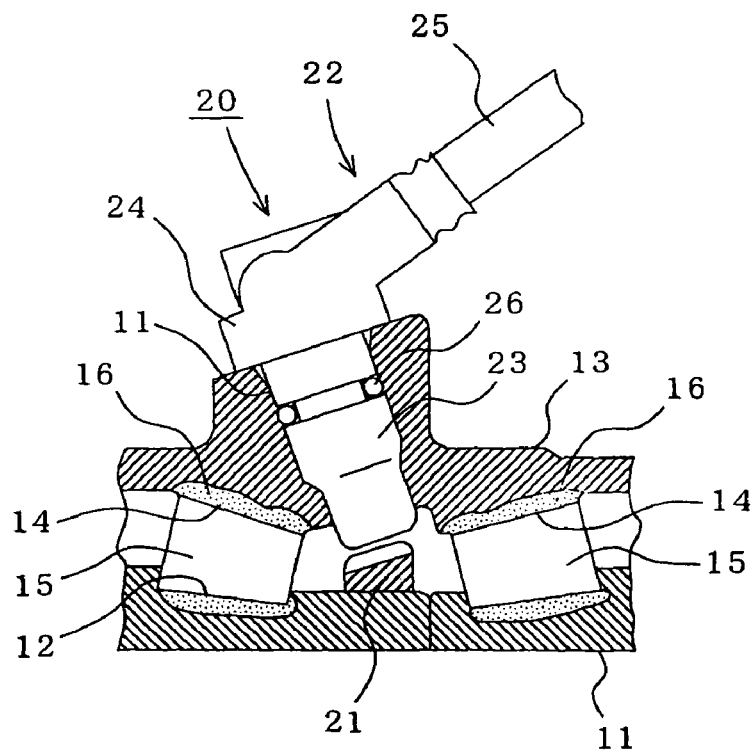
FIG. 2 is an explanatory view of an essential part of FIG. 1.

FIG. 1 is a longitudinal sectional view of a bearing apparatus for an axle in Embodiment 1 according to the invention, and FIG. 2 is an explanatory view of an essential part of FIG. 1. It is to be noted that the right side of the drawing is referred to as an inner side, and the left side of the drawing is referred to as an outer side, in the following description.

In the drawings, numeral 1 represents a bearing apparatus for an axle. A hub shaft 2 formed of steel lumber is provided, on its outer periphery at the outer side, with a flange 3 having a plurality of bolt hole parts 4 into which bolts 19 for mounting a wheel (not shown) are press-fitted. A center part of the flange 3 is projected to the inner side, to form a cylindrical part 5 to which a bearing part 10, which will be described below, is fitted. Numeral 6 represents a through hole part which is formed through a center part of the cylindrical part 5 in an axial direction, and into which a drive shaft is inserted.

The bearing part 10 includes an inner ring 11, an outer ring 13, and a plurality of taper rolling elements 15. The inner ring 11 is formed of steel lumber such as bearing steel, and divided in two sections which are respectively provided with rolling contact surfaces (raceway surfaces) 12 between rib portions formed at both ends of the inner ring. The outer ring 13 is formed of steel lumber such as bearing steel, and provided with double rows of rolling contact surfaces 14 corresponding to the rolling contact surfaces 12 of the inner ring 11. The taper rolling elements 15 are rolling elements formed of steel lumber such as bearing steel which are arranged in double rows between the rolling contact surfaces 12 and 14 of the inner ring 11 and the outer ring 13. A flange 17 is formed on an outer periphery of the outer ring 13. A sensor fitting hole part 18 is diagonally formed in the outer ring 13, and a rotation detecting sensor 22 of a rotation number detector 20, which will be described below, is fitted into this hole part 18. Numeral 16 represents hardened layers which are formed by quenching on outer peripheries of the rolling contact surfaces 14 of the outer ring 13.

The rotation number detector 20 includes a pulsar ring 21 which is formed of steel lumber having undulations on its outer peripheral face, and fixed to an outer periphery of the inner ring 11 between the rolling contact surfaces 14, and the rotation detecting sensor 22 which is inserted into the sensor fitting hole part 18 provided at the outer ring 13 in such a manner that its distal end portion is opposed to the pulsar ring 21.

The rotation detecting sensor 22 includes a body part 23 which contains therein a detecting coil wound around a yoke and a magnet (both are not shown), and a securing (fitting) part 24 which is provided on an upper part of the body part 23 and contains therein a terminal board etc. (not shown). A wire cord 25 is connected to the terminal board in the securing part 24. A lower part of the body part 23 is reduced in diameter to form a small diameter part 23b. Numeral 26 represents an O-ring which is fitted to an outer periphery of the upper part (a large diameter part 23a) of the body part 23.

Figure 3:
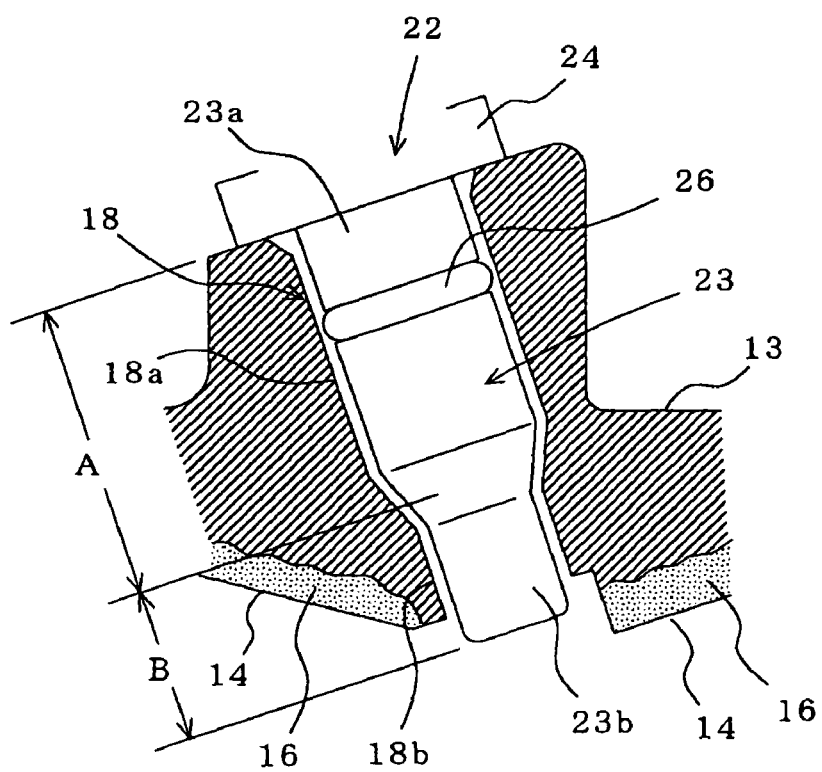
FIG. 3 is a detailed explanatory view of an essential part of FIG. 2.

As shown in FIG. 3, the sensor fitting hole part 18 is formed so as to correspond to an outer shape of the body part 23 of the rotation detecting sensor 22. Specifically, an radially outer part (may be called as a part A) 18a of the sensor fitting hole part 18 is drilled with a thick drill by strictly managing a tolerance range (for example, about ±0.05 mm), and a radially inner part 18b (may be called as a part B) is drilled with a thin drill by enlarging the tolerance range to a minus side (for example, about +0.05 to 0.3 mm). In this manner, the part B can be drilled with almost no influence from the hardened layers 16. Even though the part B interferes with the hardened layers 16, wear of the drill can be suppressed, because the hole part is drilled relatively largely (not strictly) by enlarging the tolerance range.

In order to fit the rotation detecting sensor 22 into the sensor fitting hole part 18 having the above described structure, the body part 23 which is provided with the O-ring 26 on the outer periphery of the large diameter part 23a is inserted into the sensor fitting hole part 18, and then, the securing part 24 is fixed to the outer ring 13. On this occasion, the distal end portion of the body part 23 is opposed to the pulsar ring 21 with a slight clearance. There is almost no clearance between the large diameter part 23a of the body part 23 and the radially outer part 18a of the sensor fitting hole part 18, and further, air tightness is maintained by means of the O-ring 26 which is provided on the body part 23. Therefore, dust or the like will not enter into the bearing part 10 from the exterior. Although the sensor fitting hole part 18 is diagonally provided in the outer ring 13 in the illustrated embodiment, the sensor fitting hole part 18 may be uprightly formed.

Then, an example of assembling steps of the bearing apparatus 1 for the axle as described above will be described.

As a first step, the bearing part 10 in which the pulsar ring 21 has been fixed to the inner ring 11 is press-fitted to the outer periphery of the cylindrical part 5 of the hub shaft 2 from the inner side. Thereafter, an end part of the hub shaft 2 at the inner side is caulked by folding the end part outward (a caulked part 7). In this manner, the bearing part 10 is fixed between the caulked part 7 and a stepped part 8 which is provided on the cylindrical part 5 adjacent to the flange 3 with an axial force imparted.

Then, the body part 23 of the rotation detecting sensor 22 is inserted into the sensor fitting hole part 18 which is formed in the outer ring 13, and the securing part 24 is fixed to the outer ring 13 in such a manner that the distal end portion of the body part 23 is opposed to the pulsar ring 21.

Then, the drive shaft (not shown) is fitted into the through hole part 6 in the hub shaft 2, and integrally fixed to the hub shaft 2. The bearing apparatus 1 for the axle to which the drive shaft has been mounted in this manner is fixed to an axle case or the like by means of the flange 17 which is provided on the outer ring 13 of the bearing part 10, so as not to rotate, and the hub shaft 2 containing the drive shaft and the inner ring 11 of the bearing part 10 are held so as to freely rotate.

In the bearing apparatus 1 for the axle which has been assembled as described above, when the drive shaft rotates, the hub shaft 2 and the inner ring 11 of the bearing part 10 rotate simultaneously, and the pulsar ring 21 which is fixed to the inner ring 11 also rotates within a certain magnetic field generated by the magnet which is provided in the rotation detecting sensor 22. In this manner, a magnetic path between the yoke in the rotation detecting sensor 22 and the pulsar ring 21 is changed, and induction pulse signals are generated at both ends of the coil. By measuring these signals, it is possible to detect the rotation number of the hub shaft 2.

According to the embodiment, the distal end side of the body part 23 of the rotation detecting sensor 22 is reduced in diameter to form the small diameter part 23b, and at the same time, the sensor fitting hole part 18 which is formed in the outer ring 13 of the bearing part 10 is formed so as to correspond to the outer shape of the body part 23 of the rotation detecting sensor 22. Accordingly, the sensor fitting hole part 18 can be drilled with the drill, without interfering with the hardened layers 16 on the outer ring 13. As the results, wear of the drill can be suppressed. Moreover, even though the drill interferes with the hardened layers 16, drilling can be easily performed without the problems of the shape and inaccuracy of the sensor fitting hole part 18, because the tolerance of the radially inner part 18b is relatively large (not strict).

Further, in the hub shaft 2 provided with the bearing part 10 having the taper rollers 15, as in this invention, such troubles of interference as described above are likely to occur on occasion of drilling the sensor fitting hole part 18, because the taper rollers 15 are longer in the axial direction as compared with rolling elements in a shape of a ball, and the hardened layers 16 are also longer in the axial direction. However, according to the invention, drilling can be easily performed.

Moreover, the radially outer part 18a of the sensor fitting hole part 18 is drilled with the strict tolerance, and besides, the O-ring is provided on the large diameter part 23a of the body part 23 of the rotation detecting sensor 22. Therefore, the air tightness is maintained between them, and dust or the like will not enter into the bearing part 10 from between the sensor fitting hole part 18 and the rotation detecting sensor 22.

Embodiment 2

Figure 4:
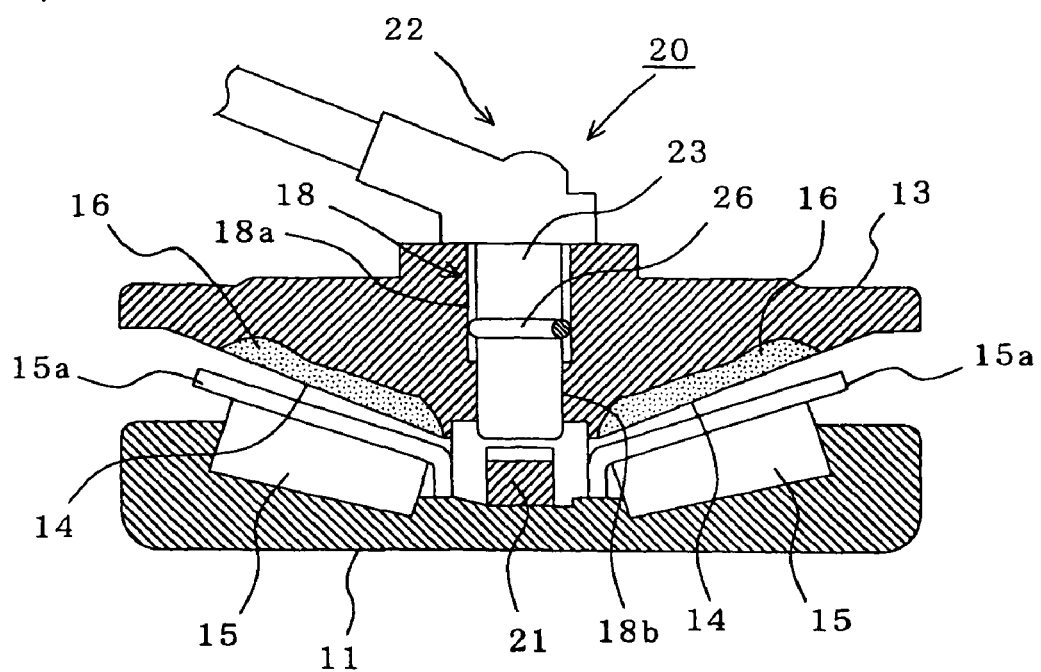
FIG. 4 is a sectional view of an essential part of a bearing apparatus for an axle in Embodiment 2 according to the invention.

FIG. 4 is a sectional view of an essential part of a bearing apparatus for an axle in Embodiment 2 according to the invention. It is to be noted that those parts which are the same as in Embodiment 1 will be denoted with the same reference numerals and their description will be omitted.

In this embodiment, the body part 23 of the rotation detecting sensor 22 has the same outer diameter along the entire length. At the same time, the sensor fitting hole part 18 is so formed that the radially outer part 18a has the inner diameter slightly larger than the outer diameter of the body part 23 of the rotation detecting sensor 22, while the radially inner part 18b has the inner diameter substantially equal to the outer diameter of the body part 23. It is desirable that strict tolerance management is carried out, in drilling the radially inner part 18b of the sensor fitting hole part 18.

Then, the body part 23 of the rotation detecting sensor 22 provided with the O-ring 26 on the outer periphery of the upper part is inserted into the sensor fitting hole part 18, and the securing part 24 is fixed to the outer ring 13. In this manner, the lower part of the body part 23 is kept in tight contact with the radially inner part 18b of the sensor fitting hole part 18 with almost no clearance, while the upper part is tightly sealed with the O-ring 26, and hence, dust or the like will not enter.

Moreover, because the radially inner part 18b has the smaller diameter, the drill will rarely interfere with the hardened layers 16 which are formed on the outer peripheries of the rolling contact surfaces 14 of the outer ring 13, on occasion of working with a drill. As the results, the sensor fitting hole part can be easily worked with enhanced accuracy, and further, wear of the drill can be suppressed.

Although in the above description, the case where the invention is applied to the illustrated bearing apparatus for the axle has been described, the invention is not limited to this case. Alternatively, it is possible to carry out the invention in a bearing apparatus for an axle having other structures, for example, in such a case that the pulsar ring is provided on the cylindrical part of the hub shaft.

Moreover, the case where the rotation detecting sensor 22 having the coil wound around the yoke and the magnet, for detecting the rotation number by measuring the pulse signals which are generated at both ends of the coil due to a change of the magnetic path between the pulsar ring and the yoke is used, as the rotation number detector 20, has been described. However, a rotation detecting sensor for detecting the rotation number by other means, for example, by employing a magnetic resister element or haul element can be also used.

Further, although the hub shaft 2 provided with the taper roller bearing has been described, it is possible to carry out the invention in a bearing apparatus for an axle having another structure, for example, a hub shaft provided with a ball bearing.

What is claimed is:

1. A method of manufacturing a bearing apparatus, the method comprising:

provided a hub shaft that includes a flange provided on an outer side thereof and to which a wheel is attached, and a cylindrical part provided on an inner side of the flange;

providing a bearing part that includes an inner ring, an outer ring formed with a sensor fitting hole part and rolling elements arranged between the inner and outer rings, the bearing part being press-fitted into the cylindrical part of the hub unit;

providing a rotation detector that includes a pulsar ring fixed to the inner ring of the bearing part, and a rotation detecting sensor including a body part and a fitting part, the body part being inserted into the sensor fitting hole part of the outer ring so that an distal end of the body part is opposed to the pulsar ring, wherein the body part of the rotation detecting sensor includes a small diameter part disposed at the distal end of the body part and a large diameter part disposed between the small diameter part and the fitting part;

forming, with a strict tolerance, a radially outer part of the sensor fitting hole part to have an inner diameter substantially equal to an outer diameter of the large diameter part of the body part;

forming, with a tolerance enlarged to a minus side relative to the strict tolerance, a radially inner part of the sensor fitting hole part to have an inner diameter slightly larger than an outer diameter of the small diameter part of the body part;

forming hardened layers by quenching along at least one of the inner peripheries of raceway surfaces of the outer ring and outer peripheries of raceway surfaces of the inner ring; and drilling the sensor fitting hole part without interfering with the hardened layers, wherein the drilling of the sensor fitting hole comprises drilling a first hole partially though the outer ring, from an outer periphery of the outer ring, and drilling a second hole, the second hole comprising a radius less than a radius of the first hole, through a remainder of the outer ring.

2. The method according to claim 1, further comprising:

forming an O-ring on an upper half of the large diameter part of the body part of the rotation detecting sensor.

3. The method according to claim 1, wherein the drilling the first hole is performed with a tolerance range less than a tolerance range with which the drilling the second hole is performed.

4. The method according to claim 1, wherein the inner diameter of the radially outer part of the sensor fitting hole part is within a range of approximately ±0.05 mm of the outer diameter of the large diameter part of the body part, and the inner diameter of the radially inner part of the sensor fitting hole part is within a range of approximately 0.05 mm to 0.3 mm of an outer diameter of the small diameter part of the body part.

5. The method according to claim 1, wherein the drilling of the sensor fitting hole comprises drilling the second hole after the drilling the first hole.

* * * * *